United States Patent [19]

Talmy et al.

[11] Patent Number: 5,521,132
[45] Date of Patent: May 28, 1996

[54] ASH-BASED CERAMIC MATERIALS

[75] Inventors: Inna G. Talmy, Silver Spring, Md.; Deborah A. Haught, Sterling, Va.; Curtis A. Martin, Germantown, Md.

[73] Assignee: The United States of America as represented by the Secretary of the Navy, Washington, D.C.

[21] Appl. No.: 299,388

[22] Filed: Sep. 1, 1994

[51] Int. Cl.$^6$ .................................. C04B 35/653
[52] U.S. Cl. .................... 501/155; 264/DIG. 49; 106/DIG.1; 588/252; 588/256
[58] Field of Search .................... 501/155; 423/DIG. 18; 264/37, DIG. 49; 106/705, 710, 707, 745, DIG. 1; 588/256, 252

[56] References Cited

U.S. PATENT DOCUMENTS

| | | | |
|---|---|---|---|
| 2,576,565 | 11/1951 | Brown | 264/DIG. 49 |
| 3,679,441 | 7/1972 | Harvey | 106/DIG. 1 |
| 4,134,775 | 1/1979 | Schwoegler | 106/DIG. 1 |
| 4,772,330 | 9/1988 | Kobayashi et al. | 501/155 |
| 4,885,203 | 12/1989 | Wakat | 501/155 |

FOREIGN PATENT DOCUMENTS

| | | | |
|---|---|---|---|
| 2114017 | 10/1971 | Germany | 106/DIG. 1 |
| 1153388 | 5/1969 | United Kingdom | 106/DIG. 1 |

OTHER PUBLICATIONS

Japanese Patent Abstract—"Electromelting Method of Fly Ash" Shimuzu et al. JP 58–79581 (Jul. 28, 1983).
*American Ceramic Society Bulletin* vol. 29 No. 5 (1950) "Utilization of Waste Boiler Fly Ash and Slags", Minnick et al. pp. 177–180.

*Primary Examiner*—Paul Marcantoni
*Attorney, Agent, or Firm*—Roger D. Johnson

[57] ABSTRACT

A ceramic material made from raw coal fly ash or raw municipal solid waste fly ash and (1) sodium tetraborate or (2) a mixture of sodium tetraborate and a calcium containing material that is triple superphosphate, lime, dolomitic lime, or mixtures thereof.

46 Claims, No Drawings

ASH-BASED CERAMIC MATERIALS

BACKGROUND OF THE INVENTION

Ash in the form of coal fly ash and of municipal solid waste (MSW) fly ash is a significant environmental problem. It is estimated that power plants in the United States generate 80,000,000 tons of fly ash by burning coal. Only about 20% of this amount is utilized and the rest is landfilled. Coal fly ash has complex chemical composition containing up to 80 weight percent of $SiO_2$ and $Al_2O_3$, with $Fe_2O_3$, CaO, MgO, $Na_2O$, $K_2O$, $SO_3$ and other oxides as the remainder. It may also contain traces of hazardous elements such as arsenic, lead, barium, and mercury. The chemical composition significantly varies depending on coal deposits and power plant operating parameters. In addition to coal fly ash, large quantities of municipal solid waste (MSW) ash are being produced by the incineration of municipal trash, garbage, and even sewage solids.

Fly ash has been used in cement as a substitute for shale; in concrete as a substitute for cement and sand, and as aggregates; in road construction as a filler to bitumen, and as a substitute for sand in the foundation layer; in bricks as a substitute for clay; for soil stabilization; etc. These prior art uses do not lead to massive consumption of fly ash because the ash is usually only a minor component in these composites. It would be desirable to provide processes and products that would use fly ash as the major component, preferably in amounts exceeding 85 weight percent.

Additionally, it is important that the fly ash products be cost competitive to produce. This is particularly true in the case of bricks or aggregate materials where the price competition is fierce. It is therefore desirable that the processing occur a lower temperatures than are used in conventional manufacturing. The lower temperatures save money by using less energy and by requiring less expensive equipment. Cost should also be kept down by using low cost materials as additives.

Finally, the fly ash products should be of good quality as judged by appearance and color and physical properties such as compressive strength, bending strength, impact strength, modulus of elasticity, abrasion resistance, thermal conductivity (R-value), thermal expansion coefficient, water stability/leachability, freeze/thaw resistance, etc.

SUMMARY OF THE INVENTION

The present invention is directed to ceramic materials made from coal fly ash and from municipal solid waste (MSW) fly ash and to processes for producing these ceramic materials. The fly ash is preferably used as it comes from the power plant or the municipal incinerator without any costly cleaning or separation steps. Over 85 weight percent of the ceramic material is fly ash with the remainder being low cost, commercially available additives such as borax and a calcium-containing material such as triple superphosphate (a common inorganic fertilizer), lime, dolomitic lime, or mixtures thereof. The ash-based ceramic materials are lighter and yet stronger than the corresponding convention products (such as clay based bricks). The environment is helped by reducing the need for ash landfills and for clay strip mines.

These advantages are achieved by providing a process of

A. mixing the coal fly ash or MSW fly ash with sodium tetraborate and a calcium containing material that is triple superphosphate, lime, dolomitic lime, or mixtures thereof;

B. forming the mixture into a green body;

C. converting the green body into an intermediate body by heating the green body up to a temperature just below the melting point of sodium tetraborate in a manner that allows water and other volatiles to be driven off and further allows carbon to burn off and the resulting gaseous oxidation products to escape;

D. converting the intermediate body into an ash-based ceramic body by firing the intermediate body at a temperature of from just above the melting point of sodium tetraborate to about 1000° C. until the sodium tetraborate and calcium-containing material melt to form a molten flux which reacts with a portion of the fly ash particles to produce a matrix of water-insoluble reaction products which bind the ash particles together; and E. cooling the ceramic material body to ambient temperature.

The product ash-based ceramic material is made of non-volatile fly ash residue particles which are bonded together by water-insoluble reaction products formed by the reaction of a molten flux mixture of sodium tetraborate and a calcium-containing material which is triple superphosphate, lime, dolomitic lime, or mixtures thereof with a portion of the residue fly ash particles, wherein the sodium tetraborate comprised from about 4 to about 10 weight percent, the calcium-containing material comprised from more than zero to 5 weight percent, and the residue fly ash particles comprised the remainder of a precursor mixture which produced the ash-base ceramic material.

DETAILED DESCRIPTION OF THE INVENTION

The term municipal solid waste (MSW) is used to describe an ash which is analogous to coal fly ash but which is produced by the burning of municipal solid waste instead of coal. Like coal fly ash, municipal solid waste fly ash is made of fine solid particles of ash which are carried away by draft or by waste gases and then deposited in flues or trapped in filters or precipitators, etc. Specifically excluded are bottom ashes or clinkers.

The present invention provides methods of producing new ceramic materials and structures from ash which includes coal fly ash and municipal solid waste (MSW) fly ash. The coal fly ash is produced by the burning of coal in power and heating plants. The MSW fly ash is produced by the burning of trash, garbage, and even sewage sludge in municipal incinerators. Two important terms are raw fly ash which refers to the ash as it comes from the power plant or the municipal incinerator and residue fly ash which refers to the ash remaining after water and other volatiles have been driven off and carbon has been burned off and the resulting gaseous oxidation products have escaped during the process of this invention. More specific terms are raw coal fly ash and residue coal fly ash and also raw MSW fly ash and residue MSW fly ash.

The ash-based ceramic product materials of the present invention comprise fly ash residue particles which are bonded together by water-insoluble reaction products produced by the reactions between components of a molten flux and portions of the residue fly ash particles which may have dissolved into the molten flux. The molten flux is produced by melting sodium tetraborate alone or preferably by melting a mixture of sodium tetraborate and a calcium-containing material that is triple superphosphate, lime, dolomitic lime, or mixtures thereof. The following weight percentages are based on the precursor mixture of anhydrous sodium tetraborate, calcium-containing material (after LOI with water and other volatiles removed), and residual fly ash (water, volatiles, and carbon removed). Note that intermediate body produced in step C of the process is made up of the precursor mixture. Whether used alone or in a mixture with a calcium-containing material, the sodium tetraborate preferably comprises from about 4 to about 10, more preferably from 4.5 to 7.5, and still more preferably from 5 to 6 weight percent of the precursor mixture. In the preferred embodiment mixture, the calcium-containing material preferably comprises from more than zero to about 5, more preferably from 1 to 5, and still more preferably from 2 to 3 weight percent of the precursor mixture. The coal fly ash residue particles or the MSW fly ash residue particles comprise the remainder of the precursor mixture. The weight relationships between the raw coal fly ash or raw MSW fly ash, the hydrated or anhydrous sodium tetraborate, and the hydrated or calcium-containing material of the starting material mixture and the corresponding coal fly ash or MSW fly ash residue particles, the anhydrous sodium tetraborate, and the calcium-containing material (after LOI with water and other volatiles removed) of the precursor mixture (or intermediate body) are described below.

The coal fly ash includes class C coal fly ash which comes from high sulfur lignite coal and the class F coal fly ash which comes from low sulfur bituminous coal. The class C fly ashes contain significant amounts of CaO resulting from the lime that is used to remove the sulfur during combustion. Table 1 gives the compositions of 7 typical fly ashes which were used to demonstrate the present process. These include type C coal fly ash from the Coal The amounts of the starting materials are chosen to produce a specific composition in the coal fly ash or the MSW fly ash precursor mixture for the ash-based ceramic product. Thus it is not the total weight of the raw coal fly ash or raw MSW fly ash that is important but rather the weight of the coal fly ash or the MSW fly ash remaining after water and other volatiles have been removed and carbon has been burned off. For example, assuming no other volatiles present, each gram of 20 percent carbon fly ash will produce only 0.80 grams of nonvolatile residue fly ash in the fly ash ceramic product. Thus, for each gram of fly ash residue needed in the fly ash-based ceramic product 1.25 grams (1÷0.80=1.25) of 20 percent carbon fly ash must be used.

Sodium tetraborate is the preferred flux material in the coal fly ash or the MSW fly ash ceramic product because it has a relatively low melting point (about 743° C.) and because it is inexpensive, being present in common, high tonnage minerals such as borax ($Na_2B_4O_7 \cdot 10H_2O$). The sodium tetraborate starting material may be either anhydrous or in a hydrated form ($Na_2B_4O_7 \cdot xH_2O$) because any water will be driven off during the final process steps. Also in the preferred process the sodium tetraborate is dissolved in water anyway. Thus, choice of the form of sodium tetraborate starting material will be based primarily on cost and availability. Borax ($Na_2B_2O_7 \cdot 10H_2O$) a low cost, high tonnage mineral is an excellent choice. However, other minerals such as Kernite ($NaB_4O_7 \cdot 4H_2O$), and tincalconite ($Na_2B_4O_7 \cdot 5H_2O$), may also be used.

The amount of sodium tetraborate starting material is selected to produce a desired amount of anhydrous sodium tetraborate in the precursor mixture for the ash-based ceramic product. The weight of the water in the sodium

TABLE 1

CHEMICAL COMPOSITION OF VARIOUS FLY ASH SAMPLES
(WEIGHT PERCENT)
FLY ASH ORIGIN

| OXIDE | Coal Creek Station, ND | Albright Station, Allegheny Power | Hatfield Station, Allegheny Power | Baldwin Power Station, IL | Pleasants, Allegheny Power | Rivesville, Allegheny Power | Spurlock Station, OH |
|---|---|---|---|---|---|---|---|
| $SiO_2$ | 46.0 | 56.58 | 50.09 | 49.0 | 45.32 | 58.79 | 53.00 |
| $Al_2O_3$ | 14.5 | 27.45 | 21.57 | 19.0 | 20.38 | 27.91 | 31.80 |
| $Fe_2O_3$ | 6.73 | 10.64 | 15.24 | 15.0 | 19.60 | 8.41 | 6.50 |
| CaO | 17.9 | 1.7 | 4.95 | 5.0 | 9.45 | 1.20 | 3.07 |
| $SO_3$ | 1.36 | 0.90 | 0.88 | 4.3 | 0.56 | 1.01 | 0.29 |
| MgO | 5.08 | 0.79 | — | 0.9 | 1.07 | 0.46 | 0.50 |
| $Na_2O$ | 1.16 | 0.29 | 0.45 | 0.9 | 0.44 | 0.47 | 0.87 |
| $K_2O$ | 1.86 | 2.45 | — | 2.0 | 1.92 | 2.07 | — |
| $P_2O_5$ | 0.17 | 0.41 | — | — | 0.16 | 0.23 | — |
| LOI, % | 0.3 | 3.1 | 1.7 | 2.3 | 10.5 | 28.3 | 2.0 |

Creek Station in North Dakota as well as various sources of type F coal fly ash including Rivesville with approximately 28 weight percent carbon.

The present process works well with high as well as low carbon coal fly ash. The coal fly ash preferably contains from zero to 20 weight percent carbon. More preferably the coal fly ash will contain from zero to 15 and still more preferably from zero to 10 weight percent carbon. Low carbon coal fly ash (about 1 to 3 weight percent carbon) is in demand for special applications. It is useful and economical, therefore, to use coal fly ash containing preferably from 4 to 20, more preferably from 4 to 15, and still more preferably 4 to 10 weight percent carbon. During the process of this invention, carbon is burned out of the coal fly ash. The removal of carbon increases porosity between fly ash particles resulting in a lighter ceramic product.

tetraborate starting material must be excluded. The amount of hydrated sodium tetraborate must be increased to compensate for the weight of water. For example, for each gram of anhydrous sodium tetraborate ($Na_2B_4O_7$) needed in the fly ash-based ceramic product, 1.89 grams of $Na_2B_4O_7 \cdot 10H_2O$ (borax) starting material is needed. (mol wt. $Na_2B_4O_7 \cdot 10H_2O$/mole wt. of $Na_2B_4O_7$=381.2/201.2= 1.89).

The combination of the coal fly ash or the MSW fly ash and only the sodium tetraborate as flux will produce useful ceramic products. This is particularly true of class C coal fly ash which contains substantial amounts of calcium. However, when MSW fly ash or class F coal fly ash is used, care must be taken to avoid overfiring which may result in characteristic cracks in the fly ash ceramic product. One solution to the problem is to reduce the firing temperature at which the molten sodium tetraborate is reacted with portions of the ash particles. This firing temperature is reduced until the cracks no longer appear.

A preferred approach is to add a calcium-containing material that is triple super phosphate, lime, dolomitic lime, or mixtures thereof to the sodium tetraborate flux. The calcium-containing material greatly extends the acceptable firing temperature range and strengthens the coal fly ash or the MSW ash ceramic product. The calcium-containing material is an important part of the preferred embodiment composition and process, especially for class F coal fly ash and MSW fly ash ceramic products. The most preferred calcium containing material is triple superphosphate because it is water soluble and because it produces the strongest ash-based ceramic material products.

Triple superphosphate is produced in large quantities by the fertilizer industry and is inexpensive. It is produced by the chemical action of concentrated phosphoric acid on ground up phosphate mineral rocks. Because of the manner in which it is produced, there may be some variation in the composition of triple superphosphate depending on its source. For example, the $P_2O_5$ equivalency is known to range from 43 to 50 percent. Nevertheless, the preferred range of weight percent of triple superphosphate will be operative for all commercially available triple superphosphate. As with the other ingredients, adjustments are made for water or other volatile materials that may be present in the triple superphosphate. For instance, the commercial triple superphosphate used in the examples has a loss on ignition (LOI) of about 21 weight percent. This weight loss results from water and other volatiles being driven off during the heating process. To compensate for this loss, 1.45 grams $(1.0/(1.0-0.31)=1.0/0.69=1.45)$ of the raw commercial triple superphosphate is used for each gram of triple superphosphate needed in the precursor mixture. For triple superphosphate from other sources, the LOI can be determine simply by heating the sample and measuring the weight loss. The amount of raw commercial triple superphosphate needed to compensate for this LOI is then easily calculated.

Commercially available lime and dolomitic lime may be used. Limestone ($CaCO_3$) is calcinated (heated) to remove $CO_2$ and produce lime (CaO). Similarly dolomite (about a 1:1 molar ratio of $CaCO_3$ and $MgCO_3$) is calcinated (heated) to remove $CO_2$ and produce dolomitic lime (about a 1:1 molar ratio of CaO and MgO). Lime (CaO) reacts exothermically with water to produced slaked lime ($Ca(OH)_2$). MgO is much less reactive with water than CaO is. Thus, the reaction between dolomitic lime and water will produce primarily a mixture of $Ca(OH)_2$ and MgO under usual conditions. Under more extreme conditions the MgO can be converted to $Mg(OH)_2$. During the process of this invention, $Ca(OH)_2$ and $Mg(OH)_2$ will be converted back to CaO and MgO before the final sintering step and the reactions with the fly ash components. The term lime as used here includes CaO, $Ca(OH)_2$, or mixtures thereof. Dolomitic lime is a mixture of a calcium component (lime) that includes CaO, $Ca(OH)_2$, or mixtures thereof and a magnesium component that is MgO, $Mg(OH)_2$, or mixtures thereof. In general, the molar ratio of the calcium component to the magnesium component is about 1:1 in dolomitic lime. The lime and dolomitic lime can be mixed together to provide a mixture containing from more than zero to about 50 mole percent of MgO (or $Mg(OH)_2$) with the remainder being CaO (or $Ca(OH)_2$).

The general process for producing the coal fly ash or the municipal solid waste (MSW) fly ash ceramic product comprises the following stages: (1) mixing the raw fly ash with the flux sodium tetraborate and calcium-containing material additives, (2) forming the mixture into a strong green body of the desired shape, (3) heating the green body up to the firing a temperature just below the melting point of sodium tetraborate temperature in a manner which allows water and other volatiles to be driven off and further allows carbon to be burned off and the resulting gaseous oxidation products to escape to form an intermediate body, (4) firing the intermediate body at a temperature of from just above the melting point of sodium tetraborate to about 1000° C. to form of water-insoluble reaction products which bind the ash particles together and which is formed from the reaction of the flux components (sodium tetraborate and the calcium-containing material) and material from the residue fly ash particles, and (5) cooling down the fly ash-based ceramic product.

The raw coal fly ash or the raw municipal solid waste (MSW) fly ash can be mixed with the sodium tetraborate ($Na_2B_4O_7 \cdot xH_2O$) and calcium-containing material by conventional methods. The raw coal fly ashes are used as they come from the power plants. Similarly, raw MSW fly ashes are used as they come from the municipal incinerators. The sodium tetraborate mineral (for example borax, $Na_2B_4O_7 \cdot xH_2O$), triple superphosphate, lime, and dolomitic lime should be in the form of powders. Large pieces and aggregates will be preferably ground to powders which can be more easily and uniformly mixed with the raw ash particles. It is preferable to mix the sodium tetraborate and calcium-containing material (triple superphosphate; lime; dolomitic lime) together before mixing them with the ash particles in order to assure a more uniform distribution. The raw fly ash particles, sodium tetraborate, and calcium-containing material may be dry mixed by repeated sieving, or preferably wet mixed by conventional methods (including slurries).

An even more preferable method of mixing is to dissolve sodium tetraborate and triple superphosphate in hot water at a temperature of preferably 60° C. to the boiling point of water or of the aqueous solution at ambient pressure, more preferably from 85° C. the boiling point of water or the aqueous solution at ambient pressure, and still more preferably from 95° C. to the boiling point of water or the aqueous solution at ambient pressure. The resulting hot solution is mixed with the cold or the preheated raw coal fly ash or raw MSW fly ash until the solution wets the surface of the ash particles. The ash is preferably preheated so that it will not cause localized cooling of the solution during mixing. Of course, the ash should not be hot enough to cause significant vaporization of the water. Preferably the ash is heated to a temperature of from about 100° C. to about 110° C. The amount of water used is preferably just enough to dissolve all the sodium tetraborate and triple superphosphate and wet most of the fly ash particle surfaces. After the preheated coal fly ash or MSW fly ash and the hot aqueous sodium tetraborate/triple superphosphate solution have been thoroughly mixed, the mixture is allowed to cool to room temperature. Because both sodium tetraborate and triple superphosphate are significantly more soluble in hot water than in water at room temperature, the sodium tetraborate and the triple superphosphate deposit to form an intimate mixture with the raw coal fly ash or the raw MSW ash particles during this cooling step. In a less preferred embodiment only the sodium tetraborate is used with the coal fly ash or MSW fly ash particles. Even if the preferred amount of water is used, the moisture content of the sodium tetraborate/triple superphosphate/ash mixture will be about 10 percent. If an excess of water was used, it will be correspondingly more. Next, water is evaporated from the ash until the moisture content is reduced to about 3 to 5 percent which is suitable for semidry-pressing.

Lime and dolomitic lime will not dissolve in water but they can be dispersed in a sodium tetraborate solution. Thus the process for using the sodium tetraborate solution described above can be modified by adding lime powder, dolomitic lime powder, or mixtures thereof to the sodium tetraborate solution to form a suspension. Convention wet mixing techniques are used to mix the suspension with the coal fly ash or MSW fly ash particles. Temperature for the suspensions and ash are as described above for the sodium tetraborate solutions and ash. As the suspension cools, sodium tetraborate precipitates on to the surfaces of the lime or dolomitic lime particles as well as the surfaces of the ash particles. This increases the speed at which the lime or dolomitic lime becomes part of the molten flux during the final firing step.

The mixture of fly ash, sodium tetraborate, and calcium-containing material, however mixed, is then semidry-pressed into green bodies of the desired shape. These shapes may be conventional bricks, tiles, blocks, slabs, custom shapes, aggregates, etc. Or the shapes may be sheets or layers that can later be broken up into aggregates after the ash-based ceramic material has been formed by the process. For semidry-pressing the moisture (water) content of the mixture is from 3 to 5 percent. Thus, if the ingredients were dry mixed, water must be added. If the ingredients are wet mixed by conventional means using a slurry, the amount of water used at the time of mixing can be adjusted to yield a suitable moisture content in mixture for semidry-pressing. If an excess of water was required for mixing, it can be reduced by evaporation. Similarly, if a solution of sodium tetraborate and triple superphosphate in water is used, the moisture content can be reduced to 3 to 5 percent by evaporation if necessary. Conventional semidry pressing procedures produce strong green bodies which can be handled, stacked on kiln cars, or rough machined.

In the next step, the green bodies are heated from room temperature up to just below the melting point of sodium tetraborate. Two important processes must occur during this heating step. First, substantially all water (including water of crystallization) and substantially all other volatile materials are driven off from the green bodies. The object is to do this as quickly as possible but a rate still slow enough to avoid the build up of pressure which can damage the green bodies. Second, at about 400° C. carbon begins to be burned in air and form gaseous oxidation products which are removed or allowed to escape from the green body. The carbon should be burned at a rate slow enough to avoid the build up of pressure and damage to the green bodies. It is important that substantially all the water, other volatiles, and carbon are removed before the melting point of sodium tetraborate (742° C.) is reached. Water and other volatiles as well as the gaseous oxidation produces of carbon combustion can cause bubbling and cracking of the material.

Procedures that can be used to remove water, volatile materials, and carbon without damage to the green bodies are conventional and well understood by persons of ordinary skill in the brick, tile, and ceramic industries. For example, low carbon (about 3 or less weight percent carbon) fly ash can be heated in a ramp or series of ramps up to firing temperature. Typical rates would be preferably from about 1° to about 3° C. per minute and more preferably from 1.5° to 2.0° C. per minute. For high carbon content ash (4 percent or more carbon) the temperature is ramped up at a rate of preferably from about 0.1° to about 1° C. per minute and more preferably from 0.25° to 0.75° C. per minute to a temperature in the range of preferably from about 400° C. to about 600° C., more preferable from 525° C. to 575° C., and still more preferably about 540° C. to 560° C. and held in that temperature range until substantially all the free carbon has been burned off to form the intermediate bodies. The temperature of the intermediate bodies is then ramped up to the firing or sintering temperature. This last ramp can be the same as for low carbon fly ash because the intermediate bodies are substantially free of those materials which might have caused pressure to build up. These heating procedures are intended only as a general guide. The heating rates are relatively narrow because they are designed to work with a wide range of fly ash compositions. As a person of ordinary skill in the brick, tile, or ceramic arts will recognize, the heating conditions can be changed considerably from these suggestions in order to optimize the procedure for a particular fly ash composition. A simple thermogravometric analysis of the fly ash takes only a few hours and provides the necessary information for a person of ordinary skill to design an optimum heating procedure for the safe removal of water, volatiles, and carbon from the green bodies.

Again, it is critical that substantially all the water and other volatile materials and substantially all the carbon be removed from the ash prior to the final firing stage to prevent bubbling and cracking of the ash-based ceramic products. The removal of these undesirable components converts the green body into an intermediate body whose composition is the precursor mixture for the final ceramic body. Intermediate body and precursor mixture are defined and described above.

The final firing step is performed by heating the precursor mixture (intermediate body) at a temperature of preferably from just above the melting point of sodium tetraborate to about 1000° C., more preferably from 750° C. to 950° C., and still more preferably from 800° C. to 900° C. During this final firing the sodium tetraborate flux or the sodium tetraborate/calcium-containing material flux mixture melts and chemicals in a portion of the residue fly ash particles react with the sodium tetraborate and the calcium-containing material of the molten flux to produce water-insoluble reaction products which bind the residue fly ash particles together as a ceramic material. The exact chemical compositions of the water insoluble reaction products are not known. However, the water-insoluble reaction products strongly bond the residue fly ash particles together and are very resistant to leaching by water. As a result, the ceramic material is excellent for construction.

When sodium tetraborate is used alone as the flux for class F coal fly ash, the resulting ceramic material may have cracks due to overfiring during the final firing step. These may be eliminated by reducing the firing temperature and/or time. However, it is preferable to eliminate or reduce the cracks by the addition of the calcium-containing material which is preferably triple superphosphate, lime, dolomitic lime, or mixtures thereof. Relatively crack free composite structures are obtained when class C fly ash is used with only sodium tetraborate as the flux material. This is probably because of the high CaO content of the class C fly ash. However, it is still preferable to add a calcium-containing material to the sodium tetraborate to increase the strength of the class C fly ash-based ceramic material products. For MSW fly ash produced by the incineration of municipal trash, garbage, or sewage, the mixture of sodium tetraborate and a calcium-containing material is preferred as the flux.

A less preferred alternative procedure is to convert the raw coal fly ash or municipal solid waste fly ash particles into residual fly ash particles prior to mixing with the sodium tetraborate or the mixture of sodium tetraborate and calcium-containing material. This is less preferred because it adds a step to the manufacturing process.

The general nature of the invention having been set forth, the following examples are presented as a specific illustration thereof. It will be understood that the invention is not limited to these specific examples but is susceptible to various modifications that will be recognized by one of ordinary skill in the art.

In the following examples the amounts of raw starting materials has been increased to compensate for weight loss on ignition (LOI) which occurs during the heating process. The LOI for each of the fly ash types can be found in table 1. Anhydrous sodium tetraborate ($Na_2B_4O_7$) has a LOI of zero percent. If Borax ($Na_2B_4O_7.10H_2O$) is used, the weight loss is about 47.2 percent as the water is driven off and $Na_2B_4O_7$ is formed. For the triple superphosphate used in the following experiments, the LOI was about 31 percent. The weight percentages of sodium tetraborate, triple superphosphate, and fly ash given are based on the weights of these ingredients after the loss on ignition (LOI) is completed.

EXAMPLE 1

The following procedure was used to produce ceramic products based on 5, 7.5, and 10 weight percent of anhydrous sodium tetraborate ($Na_2B_4O_7$) with the remainder being residual Hatfield coal fly ash.

Borax ($Na_2B_4O_7.10H_2O$) was mixed with water at room temperature. The borax did not dissolve completely. The borax/water mixture was then mixed with cold raw fly ash. The mixture was sieved 3 times through a 500 micron screen. The amount of water added produced a mixture with a moisture content suitable for semi-dry pressing. The mixture was semidry pressed into bars using. The resulting bars were heated from room temperature to 800° C. at a rate of 1.5° C./minute. The bars were held at 800° C. for two hours and then cooled to room temperature (a) 19.33 g of raw Hatfield coal fly ash, 1.89 g of borax ($Na_2B_4O_7.10H_2O$), and 2 g of water were used to produce a fly ash ceramic product based on 5 weight percent anhydrous sodium tetraborate ($Na_2B_4O_7$) and 95 weight percent of Hatfield residual fly ash particles which had a flexural strength of 12.3 MPa. Increasing the firing temperature to 850° C. increased the flexural strength to 24.8 MPa. However increasing the firing temperature to 950° C. only increased the flexural strength to 15.6 MPa.

(b) 18.82 g of raw Hatfield fly ash, 2.84 g borax, and 2 g of water produced a fly ash ceramic product based on 10 weight percent anhydrous sodium tetraborate the rest residual Hatfield fly ash which had a flexural strength of 14.3 MPa.

(c) 18.31 g of raw Hatfield fly ash, 3.79 g of borax, and 2 g of water to produce a ceramic produced based on 10 weight percent of anhydrous sodium tetraborate with the rest being residual Hatfield fly ash which had a flexural strength of 18.0 MPa.

EXAMPLE 2

The procedure of example was modified by dry mixing 72.48 g of raw Hatfield coal fly ash and 7.10 g borax ($Na_2B_4O_7.10H_2O$) and dry pressing the mixture into cylinders. The firing schedule was the same of that in claim 1, The ceramic product which corresponds to 5 weight percent of anhydrous sodium tetraborate had a compressive strength of 8.6 MPa.

EXAMPLE 3

16.6 grams of Borax ($Na_2B_4O_7.10H_2O$) was dissolved in 50 g of water and the solution was boiled down to 26.6 g total (10 g $H_2O$+16.6 g borax). 169.1 g of raw Hatfield coal fly ash was preheated to 75° C. The borax solution was mixed with the heated fly ash and sieved. The resulting mixture was pressed into cylinders. The cylinders were heated from room temperature to 800° C. in a ramp of 1.6° C./minute and then held at 800° C. for 4 hours. The resulting ceramic material corresponds to 5 weight percent of anhydrous sodium tetraborate had a compressive strength of 31.2 MPa.

EXAMPLE 4

The procedure of example 3 was used with 193.3 g of raw Hatfield coal fly ash and 10 g of anhydrous sodium tetraborate and 50 g of water, The water was adjusted to 5 weight percent of the total fly ash+anhydrous $Na_2B_4O_7$ weight by boiling the solution down prior to pressing, The resulting ceramic product corresponded to 5 weight percent anhydrous $Na_2B_4O_7$ and had a compressive strength of 29.8 MPa. Comparing examples 3 and 4 shows that Borax ($Na_2B_4O_7.10H_2O$) and anhydrous $Na_2B_4O_7$ give similar results, When the rate of heating was increased from 1.6° C./minute to 3.3° C./minute the compressive strength decreased to 25.5 MPa.

EXAMPLE 5

18.75 g of anhydrous sodium tetraborate ($Na_2B_4O_7$) was dissolved in 50 g of water and the resulting solution was mixed with 250 g of raw Pleasants coal fly ash (10.5% LOI; see Table 1). Water was removed by boiling until the moisture content of the mixture was 5 percent which is suitable for semi-dry pressing. The mixture was semi-dry pressed into bars. In a first run, bars were (1) heated from room temperature to 550° C. in a ramp of 100° C./how (1.6° C./minute), (2) held at 550° C. for two hours to allow carbon to burn out, (3) heated from 550° C. to 900° C. in a ramp of 100° C.//hour, and (4) fired at 900° C. for 4 hours. The resulting ceramic material which is based on 7.5 weight percent anhydrous sodium tetraborate and 92.5 weight percent residual (after LOI) Pleasants coal fly ash had a flexural strength of 26.3 MPa. In a second run, the bars were (1) heated from room temperature to 900° C. in a single ramp of 100° C./hour and (2) heated at 900° C. for 4 hours. The resulting ceramic material had a flexural strength of only 15.9 MPa. This illustrates the importance of burning out carbon in the high carbon fly ash intermediate body before firing it.

EXAMPLE 6

1 g of anhydrous sodium tetraborate and 1 g of triple superphosphate were dissolved in water and the solution was mixed with 18 g of raw Rivesville (28.3% LOI) coal fly ash. Water was removed from the mixture by boiling until the moisture content of the mixture was 5 percent. The mixture was semi-dry pressed into bars. The bars were (1) heated from room temperature to 550° C. in a ramp of 100° C./hour, (2) held at 550° C. for 2 hours to allow carbon to burn out, (3) heated from 550° C. to 900° C. in a ramp of 100° C./hour, and (4) heated at 900° C. for 4 hours. The ceramic product was based on 7 weight percent anhydrous sodium tetraborate, 5 weight percent triple superphosphate (after 31% LOI), and 88 weight percent of residual (after 28.3% LOI) Rivesville coal fly ash. The ceramic product had a flexural strength of 14.8 MPa.

EXAMPLE 7

5.0 g of anhydrous sodium tetraborate and 7.2 grams of triple superphosphate were dissolved in water and the resulting solution was mixed with 96.88 g of raw Pleasants coal fly ash. Water was removed by boiling until the moisture content of the mixture was 5 percent. The mixture was semi-dry pressed into bars. The bars were (1) heated from room temperature to 550° C. in a ramp of 100° C./hour, (2) heated at 550° C. for 2 hours to burn out the carbon, (3) heated from 550° C. to 850° C. in a in a ramp of 100° C./hour, and (4) heated at 850° C. for 4 hours. The ceramic product was based on 5 weight percent anhydrous sodium tetraborate, 5 weight percent triple superphosphate (after 31% LOI), and 90 weight percent of residual (after 10.5% LOI) Pleasants coal fly ash. The flexural strength of the ceramic product was 23.2 MPa.

EXAMPLE 8

The procedure of example 1 was used for Coal creek coal fly ash (0.3% LOI) with a final firing temperature of 800° C. The 5 weight percent $Na_2B_4O_7$ based ceramic product had a flexural strength of 16.7 MPa. The 7.5 weight percent $Na_2B_4O_7$ based ceramic product had a flexural strength of 20.5 MPa. The 10 weight percent $Na_2B_4O_7$ based ceramic product had a flexural strength of 25.8 MPa. These results are considerably better than those obtain with Hatfield coal fly ash in example 1. Coal creek fly ash is a class C fly ash with a high CaO and MgO content whereas Hatfield fly ash is a class F coal fly ash.

EXAMPLE 9

20.0 g of anhydrous sodium tetraborate and 28.94 g of triple superphosphate were dissolved in water and the solution was mixed with 366.2 g of raw Hatfield fly ash. Water was removed from the mixture by boiling until the moisture content of the mixture was 5 percent. The mixture was semi-dry pressed into bars. The bars were (1) heated from room temperature to 800° C. in a ramp of 100° C./hour and (2) heated at 800° C. for 4 hours. The ceramic product was based on 5 weight percent anhydrous sodium tetraborate, 5 weight percent triple superphosphate (after 31% LOI), and 90 weight percent of residual (after 1.7% LOI) Hatfield coal fly ash. The ceramic product had a flexural strength ($\sigma_F$) of 10.9 MPa and a compressive strength ($\sigma_c$) of 24.5 MPa. The process was repeated but with the final firing temperature being raised to 850° C. The ceramic product had a flexural strength of 11.6 MPa and a compressive strength of 52.9 MPa. This illustrates that the final firing temperature can affect the strength of the ceramic product.

EXAMPLE 10

2.5 g of anhydrous sodium tetraborate and 7.24 grams of triple superphosphate were dissolved in water and the solution was mixed with 94.1 g of raw Hatfield fly ash. Water was removed from the mixture by boiling until the moisture content of the mixture was 5 percent. The mixture was semi-dry pressed into bars. In a first run, bars were (1) heated from room temperature to 800° C. in a ramp of 100° C./hour and then (2) heated at 800° C. for 4 hours. The ceramic product was based on 2.5 weight percent anhydrous sodium tetraborate, 5 weight percent triple superphosphate (after 31% LOI), and 92.5 weight percent of residual (after 1.7% LOI) Hatfield coal fly ash. The ceramic product had a flexural strength of 5.7 MPa and a compressive strength of 12.2 MPa. In run 2, bars of the same material were (1) heated from room temperature to 850° C. in a ramp of 100° C./hour and then (2) heated at 850° C. for 4 hours. The compressive strength of the ceramic product was 13.1 MPa.

EXAMPLE 11

The procedure of example 10 was used with 5.0 g of anhydrous sodium tetraborate, 3.62 g of triple superphosphate, and 94.1 g of raw Hatfield coal fly ash and a final firing temperature of 800° C. The ceramic product was based on 5.0 weight percent of anhydrous sodium tetraborate, 2.5 weight percent triple superphosphate (after 31% LOI), and 92.5 weight percent of residual (after 1.7% LOI) Hatfield coal fly ash. The ceramic product had a flexural strength of 18.6 MPa and a compressive strength of 41.7 MPa.

EXAMPLE 12

The procedure of example 10 was used with 2.5 g of anhydrous sodium tetraborate, 3.62 g of triple superphosphate, and 95.98 g of raw Hatfield coal fly ash and a final firing temperature of 800° C. The ceramic product was based on 2.5 weight percent of anhydrous sodium tetraborate, 2.5 weight percent of triple superphosphate (after 31% LOI), and 95 weight percent of residual (after 1.7% LOI) Hatfield coal fly ash. The ceramic product had a flexural strength of 9.2 MPa and a compressive strength of 17.3 MPa.

EXAMPLE 13

5 g of anhydrous sodium tetraborate was dissolved in water and 5 g of anhydrous lime (CaO) powder was added to form a suspension. The suspension was mixed with 91.5 g of raw Hatfield coal fly ash and water was boiled off until the moisture content of the mixture was 5 percent. The mixture was semi-dry pressed into bars. The bars were (1) heated from room temperature to 800° C. in a ramp of 100° C./hour and then (2) heated at 800° C. for 4 hours. The ceramic product was based on 5 weight percent anhydrous sodium tetraborate, 5 weight percent anhydrous lime (CaO), and 90 weight percent of residual (after 1.7% LOI) Hatfield coal fly ash. The ceramic product had a flexural strength of 15.9 MPa.

Obviously, other modifications and variations of the present invention may be possible in light of the foregoing teachings. It is therefore to be understood that within the scope of the appended claims the invention may be practiced otherwise than as specifically described.

What is claimed is:

1. A process for producing a ceramic material comprising:
   A. mixing raw fly ash particles that are raw coal fly ash particles, raw municipal solid waste fly ash particles, or mixtures thereof with a flux material that is sodium tetraborate or a mixture of sodium tetraborate and a calcium-containing material that is triple superphosphate, lime, dolomitic lime, or mixtures thereof;
   B. forming the mixture of raw fly ash particles and flux material into a green body;

C. heating the green body up to a temperature just below the melting point of sodium tetraborate to drive off water and other volatiles and to burn off carbon to produce an intermediate body in which the raw fly ash particles of the green body have been converted to residual fly ash particles;

D. converting the intermediate body into a ceramic body by firing the intermediate body at a temperature of from just above the melting point of sodium tetraborate to about 1000° C. until the sodium tetraborate or mixture of sodium tetraborate and calcium-containing material melts to form a molten flux which reacts with chemicals in a portion of the residual fly ash particles to produce water-insoluble reaction products which bind the residual fly ash particles together; and E. cooling the ceramic material body to ambient temperature;

wherein the raw fly ash particles, sodium tetraborate, and calcium-containing material if present are mixed in step A in amounts that will produced an intermediate body in step C that consists essentially of from about 4 to about 10 weight percent of anhydrous sodium tetraborate, from zero about 5 weight percent of anhydrous calcium-containing material with the remainder of the intermediate body being residual fly ash particles formed from the removal of water and other volatile materials and the burning off of carbon from the raw ash particles used in the mixture of step A.

2. The process of claim 1 wherein the flux material in step A is sodium tetraborate.

3. The process of claim 2 wherein raw the fly ash used in step A is raw class C coal fly ash.

4. The process of claim 1 wherein the flux material in step A is a mixture of sodium tetraborate and a calcium-containing material.

5. The process of claim 4 wherein the calcium-containing material is triple superphosphate.

6. The process of claim 4 wherein the calcium-containing material is lime.

7. The process of claim 4 wherein the calcium-containing material is dolomitic lime.

8. The process of claim 4 wherein the calcium-containing material is a mixture of lime and dolomitic lime.

9. The process of claim 1 wherein the amount of sodium tetraborate used in step A will produce an anhydrous sodium tetraborate content of from 4.5 to 7.5 weight percent in the intermediate body in step C.

10. The process of claim 9 wherein the amount of sodium tetraborate used in step A will produce an anhydrous sodium tetraborate content of from 5 to 6 weight percent in the intermediate body in step C.

11. The process of claim 1 wherein the amount of calcium-containing material used in step A will produce an anhydrous calcium-containing material content of from more than zero to about 5 weight percent in the intermediate body in step C.

12. The process of claim 11 wherein the amount of calcium-containing material used in step A will produce an anhydrous calcium-containing material content of from 1 to 5 weight percent in the intermediate body in step C.

13. The process of claim 12 wherein the amount of calcium-containing material used in step A will produce an anhydrous calcium-containing material content of from 2 to 3 weight percent in the intermediate body in step C.

14. The process of claim 1 wherein the raw fly ash used in step A is raw coal fly ash.

15. The process of claim 14 wherein the raw fly ash used in step A is raw class F coal fly ash.

16. The process of claim 14 wherein the raw fly ash used in step A is raw class C coal fly ash.

17. The process of claim 1 wherein the raw fly ash used in step A is raw municipal solid waste fly ash.

18. The process of claim 1 wherein in step D the intermediate body is heated at a temperature of from 750° C. to 950° C.

19. The process of claim 18 wherein in step D the intermediate body is heated at a temperature of from 800° C. to 900° C.

20. The process of claim 1 wherein in step A the raw fly ash particles are mixed with an aqueous solution of (1) sodium tetraborate alone or (2) a mixture of sodium tetraborate and triple superphosphate which is at a temperature of from about 60° C. to the boiling point of the aqueous solution at ambient pressure and the resulting mixture is then cooled to ambient temperature.

21. The process of claim 20 wherein in step A the moisture content of the resulting mixture is reduced by evaporation.

22. The process of claim 20 wherein in step A the moisture content of the resulting mixture is reduced to a level in the range of from about 3 to about 5 percent.

23. The process of claim 1 wherein in step A the raw fly ash particles are mixed with a suspension of lime particles, dolomitic lime particles, or mixtures thereof in an aqueous solution of sodium tetraborate which is at a temperature of from about 60° C. to the boiling point of the aqueous solution at ambient pressure and the resulting mixture is then cooled to ambient temperature.

24. The process of claim 23 wherein in step A the moisture content of the resulting mixture is reduced by evaporation.

25. The process of claim 23 wherein in step A the moisture content of the resulting mixture is reduced to a level of from about 3 to about 5 percent.

26. A ceramic material that is produced from a precursor mixture of

A. dry residue fly ash particles that were produced by removing essentially all carbon and volatile materials from raw coal fly ash particles or raw municipal solid waste fly ash particles, or mixtures thereof, and B. a flux material that is
  (1) anhydrous sodium tetraborate alone, or
  (2) a mixture sodium tetraborate and an anhydrous calcium-containing material that is
    (a) triple superphosphate,
    (b) lime,
    (c) dolomitic lime, or
    (d) mixtures thereof;

wherein the precursor mixture consists essentially of from about 4 to about 10 weight percent of the anhydrous sodium tetraborate, from zero to about 5 weight percent of the anhydrous calcium-containing material, the remainder of the precursor mixture being the dry residual fly ash, and wherein the precursor mixture was heated at a temperature of from just above the melting point of sodium tetraborate to about 1000° C. until the flux material melted and reacted with a portion of the residue fly ash particles to form water-insoluble reaction products which bind the residual fly ash particles together.

27. The ceramic material of claim 26 wherein the flux material in the precursor mixture was sodium tetraborate.

28. The ceramic material of claim 27 wherein the residual fly ash particles were made from class C coal fly ash particles.

29. The ceramic material of claim 27 wherein the anhydrous sodium tetraborate comprised from 4.5 to 7.5 weight percent of the precursor mixture.

30. The ceramic material of claim 29 wherein the anhydrous sodium tetraborate comprised from 6 to 7 weight percent of the precursor mixture.

31. The ceramic material of claim 26 wherein the flux material in the precursor mixture was a mixture of anhydrous sodium tetraborate and an anhydrous calcium-containing material that is triple superphosphate, lime, dolomitic lime, or mixtures thereof.

32. The ceramic material of claim 31 wherein the anhydrous calcium-containing material was triple superphosphate.

33. The ceramic material of claim 31 wherein the anhydrous calcium containing material was lime.

34. The ceramic material of claim 31 wherein the anhydrous calcium-containing material was dolomitic lime.

35. The ceramic material of claim 31 wherein the anhydrous calcium-containing material was a mixture of lime and dolomitic lime.

36. The ceramic material of claim 26 wherein the anhydrous sodium tetraborate comprised from 4.5 to 7 weight percent of the precursor mixture.

37. The ceramic material of claim 36 wherein the anhydrous sodium tetraborate comprised from 5 to 6 weight percent of the precursor mixture.

38. The ceramic material of claim 26 wherein the anhydrous calcium-containing material comprised from more than zero to about 5 weight percent of the precursor mixture.

39. The ceramic material of claim 38 wherein the anhydrous calcium-containing material comprised from 1 to 5 weight percent of the precursor mixture.

40. The ceramic material of claim 39 wherein the anhydrous calcium-containing material comprised from 2 to 3 weight percent of the precursor mixture.

41. The ceramic material of claim 26 wherein the residual fly ash particles in the precursor mixture was produced from raw coal fly ash particles.

42. The ceramic material of claim 41 wherein the residual fly ash particles in the precursor mixture were produced from raw class C coal fly ash particles.

43. The ceramic material of claim 41 wherein the residual fly ash particles in the precursor mixture were produced from raw class F coal fly ash particles.

44. The ceramic material of claim 26 wherein the residual fly ash particles in the precursor mixture were produced from raw municipal solid waste fly ash particles.

45. The ceramic material of claim 26 wherein the precursor mixture was heated at a temperature of from 750° C. to 950° C. to produce the ceramic material.

46. The ceramic material of claim 45 wherein the precursor mixture was heated at a temperature of from 800° C. to 900° C.

* * * * *